Sept. 6, 1960 G. DESTRIAU 2,951,814
PHOSPHOR
Filed May 13, 1957

INVENTOR.
GEORGES DESTRIAU
BY W. D. Palmer
ATTORNEY.

United States Patent Office 2,951,814
Patented Sept. 6, 1960

2,951,814
PHOSPHOR

Georges Destriau, Cauderan, France, assignor to Westinghouse Electric Corporation, East Pittsburgh, Pa., a corporation of Pennsylvania Filed May 13, 1957, Ser. No. 658,702
2 Claims. (Cl. 252—301.6)

This invention relates to phosphors and, more particularly, to a phosphor which will display greatly-enhanced output under the simultaneous influence of an alternating electric field and X-ray excitation.

In copending application of G. Destriau, the inventor herein, S.N. 433,185, filed May 28, 1954, titled "X-Ray Electroluminescent Screen," now Patent No. 2,863,061, there is disclosed an X-ray-electroluminescent device wherein the output of an X-ray-responsive phosphor is enhanced by the simultaneous application of an electric field across the phosphor. This enhanced output enables a smaller dosage of X-rays to be used in order to achieve a useful brightness of the fluoroscopic screen or, alternatively, makes possible a brighter picture without increasing the dosage of X-rays. It is highly desirable to be able to make a fluoroscopic screen as bright as possible with as small a dosage of X-rays as possible or, alternatively, to be able to make a fluoroscopic screen respond with a useable brightness under excitation by a relatively small dosage of X-rays.

It is the general object of this invention to provide a phosphor material which has a greatly enhanced output under the simultaneous influence of an alternating electric field and X-ray excitation.

The aforesaid object of the invention, and other objects which will become apparent as the description proceeds, are achieved by providing a phosphor material of cadmium-zinc-sulfide wherein the ratio by weight of cadmium sulfide to zinc sulfide is from 30:70 to 65:35 and activated by from $1 \times 10^{-4}$ to $1 \times 10^{-2}$ parts by weight of manganese and with an additive of from $5 \times 10^{-7}$ to $1 \times 10^{-5}$ parts by weight of gold. Preferably, and for best performance, the ratio by weight of cadmium to zinc sulfides is from 40:60 to 57:43 and the manganese activator concentration is from $1 \times 10^{-3}$ to $2 \times 10^{-3}$ parts by weight with the gold additive being from $1 \times 10^{-6}$ to $5 \times 10^{-6}$ parts by weight.

For a better understanding of the invention reference should be had to the accompanying drawing wherein.

Although the principles of the invention are broadly applicable to any system wherein an X-ray-responsive phosphor of the type specified herein is to be irradiated by X-rays the invention has particular reference to fluoroscopic screens which are fabricated similar to an electroluminescent cell and hence it has been so illustrated and will be so described.

Figure 1:
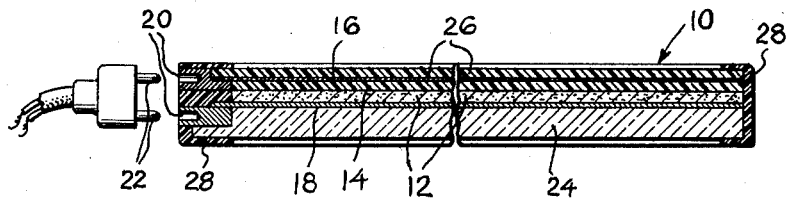
Fig. 1 is a sectional elevation of the preferred fluoroscopic screen.

In Fig. 1 is illustrated the preferred embodiment of the fluoroscopic screen 10 which comprises a substantially planar layer of luminescent material 12 adjacent a substantially planar layer of dielectric material 14 with the luminesce and dielectric materials being sandwiched between two thin, conducting layers or electrodes 16 and 18. Each of the electrodes 16 and 18 is connected thorugh suitable bus bars 20 and a suitable electrical connection 22 to the field-voltage supply. A foundation-viewing plate 24 is placed over one of the conducting layers, for example, electrode 18 and an insulating layer 26 is placed over the other conducting electrode layer 16, in order to minimize shock hazard. A protecting and handling shield 28 is provided around the entire periphery of the screen 10 in order to facilitate storage, handling, etc.

The luminescent material layer 12 is preferably positioned next to the foundation-viewing plate 24, although for some applications it may be preferable to place the dielectric layer 14 next to the viewing plate 24. The thickness of the luminescent layer 12 is not particularly critical, but as a specific example, it has a thickness of 0.2 mm. The dielectric layer 14 comprises any suitable dielectric which has a high dielectric constant, is transmissive to either visible light or X-rays depending upon its position within the screen, and will not rapidly deteriorate under the action of X-rays. Such materials are well-known and as an example, the dielectric material layer 14 comprises a mica sheet about 0.05 mm. thick, although this thickness is in no way critical and may be increased or decreased as indicated by the application.

Alternative constructions are also possible for the screen 10 and a suitable dielectric material such as polyvinylchloride acetate may be admixed with the phosphor and the separate dielectric layer dispensed with, if desired, or the dielectric material may be dispensed with entirely in some applications and only the phosphor layer 12 placed between the electrodes 16 and 18. It should be pointed out that the purpose of the dielectric material is to prevent electrical breakdown through the phosphor and between the electrodes 16 and 18 and the electric fields as may be used herein need not be particularly intense. The useable electric fields, however, may vary over a wide range as in the heretofore-mentioned patent to Destriau and as a specific example, the electric field which is applied across the screen has an intensity of 20 kv. per cm.

The conducting electrodes 16 and 18 are fabricated of any conducting materials which can be coated as a thin sheet and are transmissive to visible light in the case of the lower electrode 18 and are transmissive to X-rays in the case of the upper layer 16. Of course, these electrodes should not deteriorate appreciably under the action of X-rays. As an example, the electrode 18 is fabricated of a thin layer of tin oxide on a glass base, such as sold under the trademark NESA by Pittsburgh Plate Glass Co., Pittsburgh, Pa. Other suitable thin, conducting coatings such as oxides of zinc, cadmium, aluminum or bismuth, for example, may also be used. The electrode 16 is fabricated of tin oxide, for example, or it may be a thin coating of aluminum which may be applied by the well-known vacuum metallizing techniques. The thin protective layer 26, which is intended to insure against shock hazard and to facilitate handling, is fabricated of any X-ray transparent material which has relatively good insulation properties and plastics such as polytetrafluoroethylene are suitable. The protective layer 26 may be dispensed with, if desired, and the shock hazard eliminated by grounding the electrode 16. The foundation glass-viewing plate is fabricated of any glass which contains heavy atoms which will absorb the X-rays and thus protect the viewer. As an example, any of the well-known lead or cerium glasses are used. The protecting and handling shield 28 may be dispensed with, if desired.

The phosphor described herein has a brightness and an enhancing ratio which is approximately double to triple that realized from the phosphors described in the heretoforementioned patent to Destriau. The phosphor material comprises cadmium-zinc sulfide wherein the ratio by weight of cadmium to zinc sulfides is from 30:70 to 65:35 and the phosphor is activated by from $1 \times 10^{-4}$ to $1\times10^{-2}$ parts by weight of the phosphor of manganese. The phosphor also incorporates a gold additive in amount of from $5\times10^{-7}$ to $1\times10^{-5}$ parts by weight of the phosphor. It is this gold additive to the phosphor constituents when maintained within their indicated ranges which apparently improves the performance of the phosphor to the indicated extent. Preferably the ratio by weight of cadmium to zinc sulfide is from 40:60 to 57:43 and the manganese activator concentration is preferably from $1\times10^{-3}$ to $2\times10^{-3}$ parts by weight of the phosphor with the gold additive preferably being from $1\times10^{-6}$ to $5\times10^{-6}$ parts by weight of the phosphor. The role of the gold is not definitely understood since it apparently acts to enhance the output of the phosphor without effecting its spectral emissive characteristics and in such a role it may be termed either an additive or a coactivator.

Figure 2:
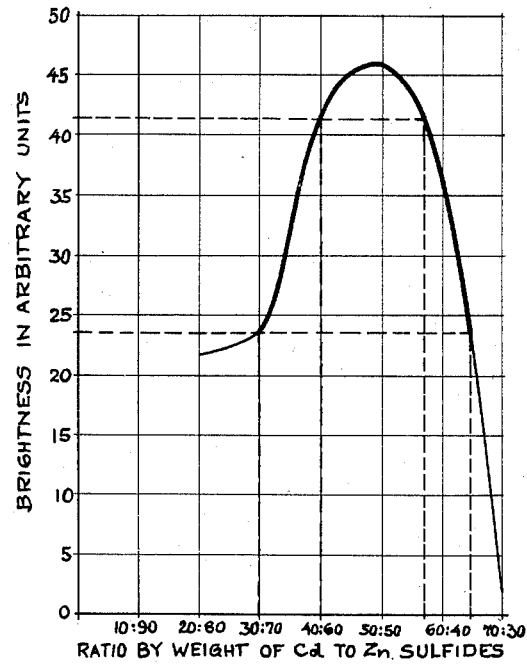
Fig. 2 is a graph of brightness in arbitrary units vs. ratios by weight of cadmium and zinc sulfides for the phosphor described herein.

In Fig. 2 is shown the effect of varying the ratio by weight of cadmium to zinc sulfides in the phosphor. In this curve there are plotted arbitrary brightness units (field acting) vs. the ratio by weight of cadmium to zinc sulfides wherein the total weight of cadmium and zinc sulfides always total one hundred. As illustrated, the curve breaks at a cadmium sulfide to zinc sulfide ratio of 30:70 and the peak of the curve occurs at a cadmium sulfide to zinc sulfide ratio of from 40:60 to 57:43. Thereafter the output drops off quite fast and at a cadmium sulfide to zinc sulfide ratio of 65:35 the output has again dropped to that which is realized when the ratio is 30:70.

In one method of preparing the phosphor described herein, finely-divided and dry cadmium sulfide and zinc sulfide are mixed. Manganese is then introduced in the form of a manganese salt such as $MnCl_2\cdot 4H_2O$ with sufficient water so that the entire admixture is slightly damp. This admixture is then dried in an oven. Gold is then introduced in the same way such as by admixing commercial gold chloride ($HAuCl_4\cdot 4H_2O$) with sufficient added water to make the entire admixture slightly damp and the entire admixture is then dried in an oven. The phosphor is then fired in covered crucibles in an air atmosphere for about one hour, for example, and the preferred firing temperature is from 1000° C. to 1050° C. although firing temperatures of from 900° C. to 1100° C. are permissible. After about one hour at the indicated firing temperature, the firing crucibles which are silica or porcelain, for example, are withdrawn from the furnace and allowed to cool with the covers in place. As a specific example, five grams of cadmium sulfide are mixed with five grams of zinc sulfide in a manner as indicated hereinbefore and the manganese chloried introduced as a 10 cc. solution containing $10^{-3}$ grams of manganese per cubic centimeter of solution. The gold is introduced as indicated hereinbefore as a 5 cc. commercial gold chloride solution containing $10^{-5}$ grams of gold per cc.

It has been found that the performance of the phosphor will be excellent when a small amount of excess sulphur is included in the raw-mix zinc-cadmium sulfides. Such excess sulphur may be incorporated by utilizing a mixture of zinc and cadmium sulfides, in the indicated amounts, and which contain a small excess of sulphur. Alternatively, a small amount of free sulphur may be added to the raw mix, such as by adding one-half gram of sulphur to the raw mix as given in the foregoing example. The foregoing conditions of preparation of the phosphor are such that a small portion of the phosphor constituents may be converted to the oxide and the presence of a small excess of sulphur apparently tends to inhibit this conversion. It should be understood, however, that small amounts of cadmium oxide and zinc oxide in the phosphor may be tolerated.

Figure 3:
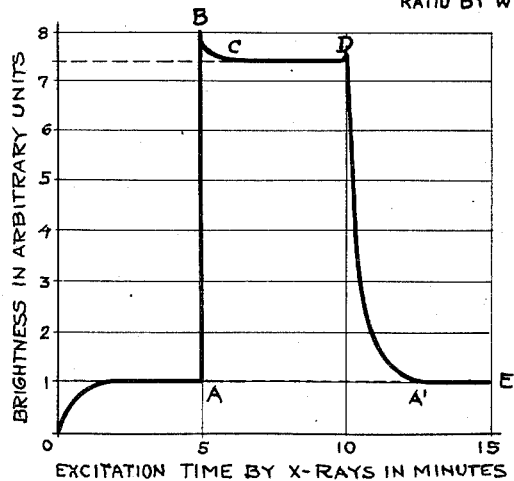
Fig. 3 is a graph of brightness in arbitrary units vs. time showing the response of a fluoroscopic screen incorporating the phosphor described herein when operated in the prescribed manner.

In Fig. 3 is illustrated one method of operating a fluoroscopic screen incorporating the phosphor described herein. In this method as illustrated the X-rays are first applied to the screen, which will respond with a brightness following the curve portion O—A. After five minutes of X-ray excitation, for example, the alternating electric field is applied across the phosphor by applying an alternating potential of sixty cycles, for example, to the electrodes 16 and 18. On application of the electric field, while maintaining the X-ray excitation of the phosphor, the resulting brightness will follow the curve porion A—B. A sharp pip is realized when the field is first applied and thereafter the brightness levels off and follows the curve portion C—D. Upon removing the field a small pip will occur and thereafter the brightness decreases rapidly following the general curve portion D—E. It should be understood that without the simultaneous application of the field, the brightness would follow the dotted line A—A'. Of course, the initial X-ray irradiation period, before the field is applied, may be shortened considerably.

The arbitrary brightness units which are plotted as the ordinate in Fig. 3 are arbitrary selected and are not the same as the brightness units which are given in Fig. 2. Fig. 3 shows the best enhancement which has been achieved to date, which is an enhancing ratio of 7.4:1. The maximum brightness is realized is appreciably better than that obtainable with commercially-available fluoroscopic screens.

It should be realized that the screen may be operated so as initially to apply both the exciting X-rays and the electric field. In such a method of operation, the resulting brightness will gradually increase to the level indicated by the curve portion C—D in Fig. 3. It should be noted that the phosphor described herein displays only a very small electroluminescence per se, and at the indicated applied field, the brightness level is so low that the gray-adapted eye cannot perceive any response.

It will be recognized that the objects of the invention have been achieved by providing an improved phosphor which will display a greatly-enhanced output under the simultaneous influence of X-rays and an alternating electric field.

While in accordance with the patent statutes, one best embodiment of the invention has been illustrated and described in detail, it is to be particularly understood that the invention is not limited thereto or thereby.

I claim:

1. A phosphor material consisting essentially of

CdS·ZnS wherein the ratio by weight of Cd to Zn sulfides is from 30CdS:70ZnS to 65CdS:35ZnS and activated by from $1\times10^{-4}$ to $1\times10^{-2}$ parts by weight of manganese, and with an additive of from $5\times10^{-7}$ to $1\times10^{-5}$ parts by weight of gold.

2. A phosphor material consisting essentially of

Cds·ZnS wherein the ratio by weight of Cd to Zn sulfides is from 40CdS:60ZnS to 57CdS:43ZnS and activated by from $1\times10^{-3}$ to $2\times10^{-3}$ parts by weight of manganese, and with an additive of from $1\times10^{-6}$ to $5\times10^{-6}$ parts by weight of gold.

References Cited in the file of this patent

UNITED STATES PATENTS

| | | |
|---|---|---|
| 2,402,757 | Leverenz | June 25, 1946 |
| 2,454,499 | Byler | Nov. 23, 1948 |
| 2,614,082 | Smith | Oct. 14, 1952 |
| 2,623,858 | Kroger | Dec. 30, 1952 |
| 2,780,731 | Miller | Feb. 5, 1957 |
| 2,782,168 | Fetters | Feb. 19, 1957 |

OTHER REFERENCES

Electroluminescence and Related Topics, by Destriau et al., from Proceedings of the I.R.E., vol. 43, No. 12, December 1955, pp. 1911 to 1938.